United States Patent
Tamura

(10) Patent No.: US 7,040,639 B2
(45) Date of Patent: May 9, 2006

(54) VEHICLE BODY STRUCTURE EMPLOYING GUSSETS FASTENED TO CROSS MEMBER PORTION BETWEEN DAMPER BASES

(75) Inventor: Naoyuki Tamura, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 315 days.

(21) Appl. No.: 10/654,039

(22) Filed: Sep. 3, 2003

(65) Prior Publication Data

US 2004/0051292 A1    Mar. 18, 2004

(30) Foreign Application Priority Data

Sep. 18, 2002    (JP)    ............................. 2002-271635

(51) Int. Cl.
    *B62D 21/11*    (2006.01)

(52) U.S. Cl. ...................... 280/124.147; 280/124.109; 280/787; 296/203.4

(58) Field of Classification Search ......... 280/124.145, 280/124.146, 124.147, 124.109, 124.135, 280/124.136, 124.138, 781, 785, 787, 788; 296/198, 203.4, 204

See application file for complete search history.

(56) References Cited

U.S. PATENT DOCUMENTS

| | | | | |
|---|---|---|---|---|
| 4,768,274 A | * | 9/1988 | Pinnow et al. | 29/401.1 |
| 5,393,096 A | * | 2/1995 | Pierce et al. | 280/788 |
| 5,580,121 A | * | 12/1996 | Dange et al. | 296/181.4 |
| 6,293,572 B1 | * | 9/2001 | Robbins et al. | 280/124.155 |
| 6,354,616 B1 | * | 3/2002 | Morin et al. | 280/124.147 |
| 6,464,239 B1 | * | 10/2002 | Kim | 280/124.147 |

FOREIGN PATENT DOCUMENTS

JP        2001-063630        3/2001

* cited by examiner

*Primary Examiner*—David R. Dunn
(74) *Attorney, Agent, or Firm*—Hamre, Schumann, Mueller & Larson, P.C.

(57) ABSTRACT

A vehicle body structure for securing sufficient interior space and for opposing the load for forcing the suspension to fall sideward by effectively using the existing members of the body structure, thereby improving the rigidity of the vehicle body. The structure has damper bases provided at both sides of the vehicle; a cross member portion between the damper bases; and gussets fastened to both ends of the cross member portion. Each gusset is attached at the outside of an interior of the vehicle to an upper wall and a side wall of each damper base, and typically has an upper wall combined with a bottom face of the upper wall of the damper base; a side wall fastened to an outer face of the side wall of the damper base; and front and rear walls, each being joined to the upper and side walls of the gusset.

3 Claims, 9 Drawing Sheets

VEHICLE BODY STRUCTURE EMPLOYING GUSSETS FASTENED TO CROSS MEMBER PORTION BETWEEN DAMPER BASES

BACKGROUND OF THE INVENTION

1. Field of the Invention

The present invention relates to a body structure of a rear portion of vehicles, and in particular, a portion to which a rear suspension is attached.

2. Description of the Related Art

According to some known body structures of vehicles, load input from the rear suspension can be efficiently supported (refer to Japanese Unexamined Patent Application, First Publication No. 2001-63630, etc.). FIG. 9 shows an example of such conventional technique. In the figure, reference numeral 1 indicates a rear wheelhouse inner panel, and a mount bracket 2 of the rear suspension (not shown) is attached to the rear wheelhouse inner panel 1. The mount bracket 2, the rear wheelhouse inner panel 1, and the rear pillar 3 joined to the rear wheelhouse inner panel 1 are joined by the vertical ribs 4 and 4 which are arranged in the interior of the vehicle in the vertical direction. The vertical ribs 4 and 4 are joined by the horizontal rib 5. Owing to the vertical ribs 4 and 4 and the horizontal rib 5, the input load from the suspension can be efficiently supported.

However, in the above conventional structure, the vertical ribs 4 and 4 and the horizontal rib 5 protrude from the rear wheelhouse inner panel 1 toward the inside of the interior of the vehicle. Therefore, when interior finish work is performed using interior material or the like, the protruding vertical ribs 4 and 4 and the horizontal rib 5 should be covered with the interior material, thereby reducing the space of the interior, such as the space for stowing baggage.

Additionally, in the above conventional structure, pressure from below is supported by the vertical ribs 4 and 4 and the horizontal rib 5 and the corresponding load is shared by the rear wheelhouse inner panel 1 and the rear pillar 3. However, in order to oppose the load for forcing the rear suspension to fall sideward, measures such as increase of the thickness of the vertical ribs 4 and 4 and the horizontal rib 5 are necessary, thereby increasing the weight of the vehicle.

SUMMARY OF THE INVENTION

In consideration of the above circumstances, an object of the present invention is to provide a vehicle body structure for securing sufficient interior space without sacrificing the space in the interior and for opposing the load for forcing the suspension to fall sideward by effectively using the existing members of the body structure, thereby improving the rigidity of the vehicle body.

Therefore, the present invention provides a body structure of a vehicle, comprising:

damper bases (e.g., damper bases 13 in an embodiment explained below) provided at both sides of the vehicle;

a cross member portion (e.g., a cross member portion 14 in the embodiment) provided between the damper bases; and gussets (e.g., gussets 22 in the embodiment) fastened to both ends of the cross member portion, wherein each gusset is provided at the damper base and is attached at the outside of an interior of the vehicle to at least an upper wall (e.g., an upper wall 13*a* in the embodiment) and a side wall (e.g., a side wall 13*b* in the embodiment) of each damper base.

According to the above structure, the gussets do not protrude toward the inside of the interior of the vehicle, thereby securing more space in the interior. In addition, force acting from a suspension in the horizontal direction can be imposed on the cross member portion via the gusset; thus, it is possible to prevent the damper base from falling toward the inside of the interior of the vehicle. Therefore, the rigidity of the vehicle body in the vicinity of the suspension can be improved without sacrificing the space in the interior of the vehicle.

As a typical example, each gusset has:

an upper wall (e.g., an upper wall 22*a* in the embodiment) combined with a bottom face of the upper wall of the damper base;

a side wall (e.g., a side wall 22*b* in the embodiment) fastened to an outer face of the side wall of the damper base; and a front wall (e.g., a front wall 22*c* in the embodiment) and a rear wall (e.g., a rear wall 22*d* in the embodiment), each being joined to the upper wall and the side wall of the gusset.

Preferably, the gusset has an opening surrounded by the upper wall, the side wall, the front wall, and the rear wall of the gusset, and a damper of a suspension of the vehicle is disposed in the opening. Typically, the suspension is a rear suspension.

According to the above structure, the gusset has a U-shaped section which is effective for securing necessary strength, and by which a space for disposing a damper can be secured, where the space is surrounded by the front wall, the rear wall, and the side wall. Therefore, the arrangement space for the damper can be secured and sufficient strength and rigidity can be secured without increasing the (plate) thickness of the gusset. Accordingly, such a structure can contribute to space-saving and lightening of the vehicle body.

As another typical example, a lower portion of each gusset (e.g., a lower portion of the side wall 22*b* in the embodiment) is fastened to a member of a framework of the body of the vehicle, where the member is arranged in a front-rear direction of the vehicle. Typically, the member of the framework is a rear frame (e.g., a rear frame 10 in the embodiment).

Accordingly, load transmitted from the suspension can be imposed via the gusset on a member of the framework of the vehicle body, which is arranged in a front-rear direction of the vehicle. Therefore, sufficient strength and rigidity can be secured without increasing the thickness of the gusset, thereby contributing to the lightening of the vehicle body.

DESCRIPTION OF THE PREFERRED EMBODIMENTS

Hereinafter, embodiments according to the present invention will be explained with reference to the drawings. In the figures explained below, reference symbols RR, FR, and CTR respectively indicate the rear direction, the front direction, and the direction toward the inside of the interior of the vehicle.

Figure 1:
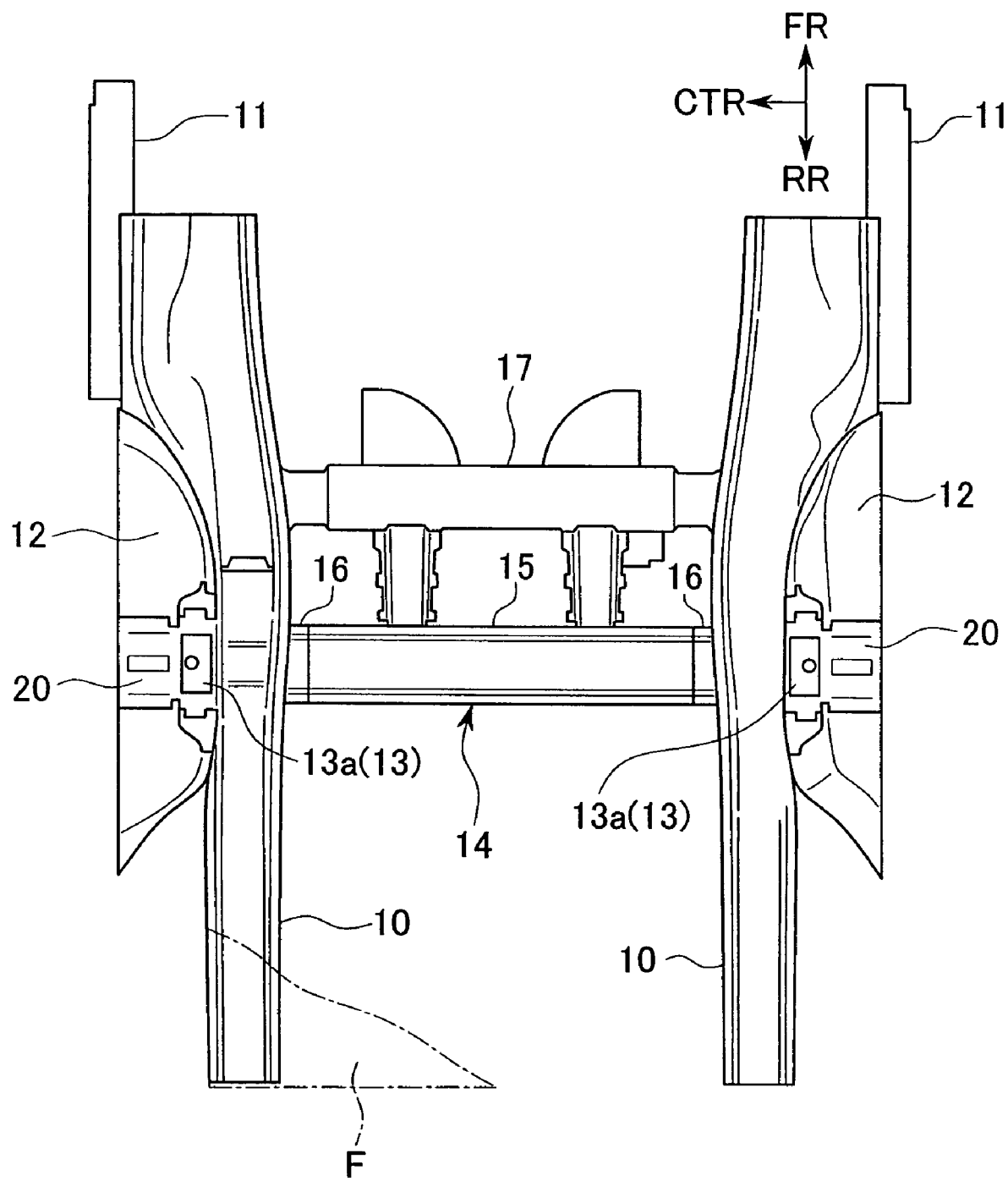
FIG. 1 is a plan view of a rear portion of the vehicle, as an embodiment of the present invention, which is viewed from the top of the vehicle.

FIG. 1 is a plan view of a rear portion of the vehicle, which is viewed from the top of the vehicle. In the figure, the rear frames 10 and 10 are provided below the floor panel F, at both sides of the vehicle body in the front-rear direction. Each rear frame 10 has an (angular) U-shaped section, and the rear frames 10 and 10 function as constituents of the framework of the vehicle body and realize a closed-section structure together with the floor panel F, where the structure extends in the front-rear direction of the vehicle.

The side sills 11 and 11 are respectively attached to front portions of the rear frames 10 and 10, and the wheelhouse inner panels 12 and 12 are respectively attached to the outer edges of the rear frames 10 and 10. Between the damper bases 13 and 13 (explained below) of the wheelhouse inner panels 12 and 12, the cross member portion 14 is provided in the width direction of the vehicle, so that a closed-section structure together with the floor panel F is formed in the width direction of the vehicle. Here, the cross member portion 14 consists of an (angular) U-shaped cross member 15 and joint members 16 and 16 attached to both ends of the cross member 15.

Reference numeral 17 indicates a support member which is provided in front of the cross member 15 and is connected between the rear frames 10 and 10.

Figure 2:
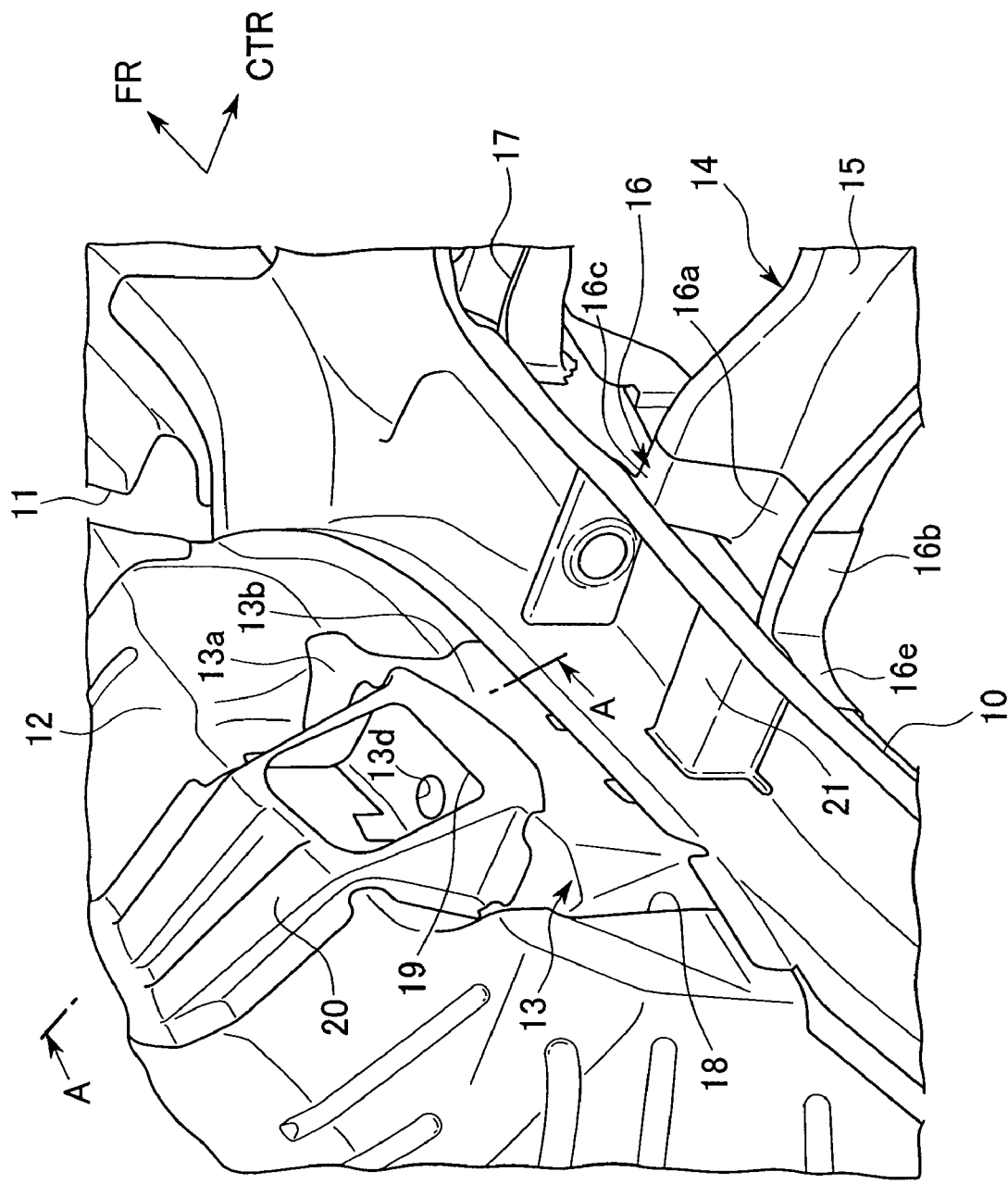
FIG. 2 is a perspective view showing a vicinity of the wheelhouse inner panel in the embodiment, which is viewed from the top side of the vehicle toward the inside of the interior, and from an inclined direction from the rear.

FIG. 2 is a perspective view showing a vicinity of the wheelhouse inner panel 12, which is viewed from the top side of the vehicle toward the inside of the interior, and from an inclined direction from the rear. The wheelhouse inner panel 12 has a central portion which is concave toward the outside of the vehicle, thereby forming an opening 18 at this portion. The damper base 13, formed by using a plate thicker than that of the wheelhouse inner panel 12, is welded to inner panel 12 at the opening 18. Specifically, the damper base 13 has a flat upper wall 13a and a side wall 13b which joins with the upper wall 13a and extends downward from the upper wall 13a. Here, the damper base 13 is welded from the outside of the interior via the peripheral flange 13c (see FIG. 4). In addition, an attachment hole 13d is formed in the upper wall 13a so as to permit the attachment of damper D (explained below).

The reinforcement 20 is joined to the top of the damper base 13, where the reinforcement 20 is also joined to the wheelhouse inner panel 12 in a manner such that the reinforcement 20 extends from the upper side toward the lower side of a central portion (in the front-rear direction) of the wheelhouse inner panel 12. The lower portion of the reinforcement 20 is joined to the upper wall 13a and the side wall 13b of the damper base 13. In addition, a bulkhead 21 is attached inside the rear frame 10, so as to prevent the U-shaped rear frame 10 from being deformed and opened.

Figure 3:
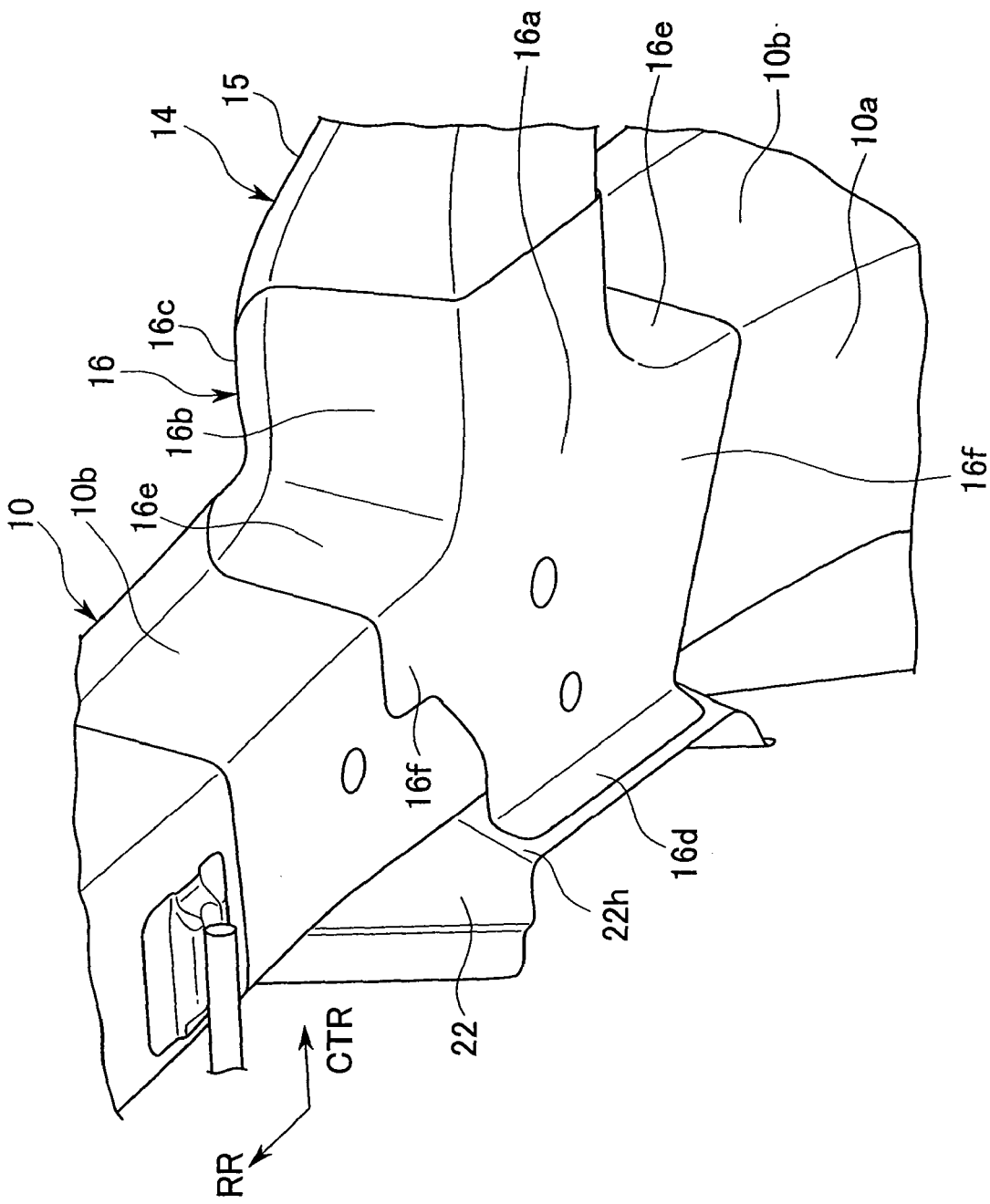
FIG. 3 is a perspective view of the vehicle body in the embodiment, which is viewed from the bottom side of the vehicle, and from an inclined direction from the rear.

The joint members 16 function as the two ends of the cross member portion 14. As shown in FIG. 3, the joint member 16 has a bottom wall 16a welded to the cross member 15, side walls 16b, and flange portions 16c joined to the floor panel F. The bottom wall 16a of the joint member 16 extends toward the outside of the interior of the vehicle, and the end of the extended portion bends downward and functions as an attachment flange 16d which is joined to the lower flange 22h (see FIG. 3) at the lower end of the side wall 22b of the gusset 22 (explained below).

FIG. 3 is a perspective view of the vehicle body, which is viewed from the bottom of the vehicle, and from an inclined direction from the rear. As shown in FIG. 3, each side wall 16b of the joint member 16 has an attachment portion 16e which joins to the side wall 10b of the rear frame 10. The extension walls 16f and 16f, which are bent portions joined to the attachment portions 16e and 16e, are formed as extensions of the bottom wall 16a of the joint member 16 in the front-rear direction.

Figure 4:
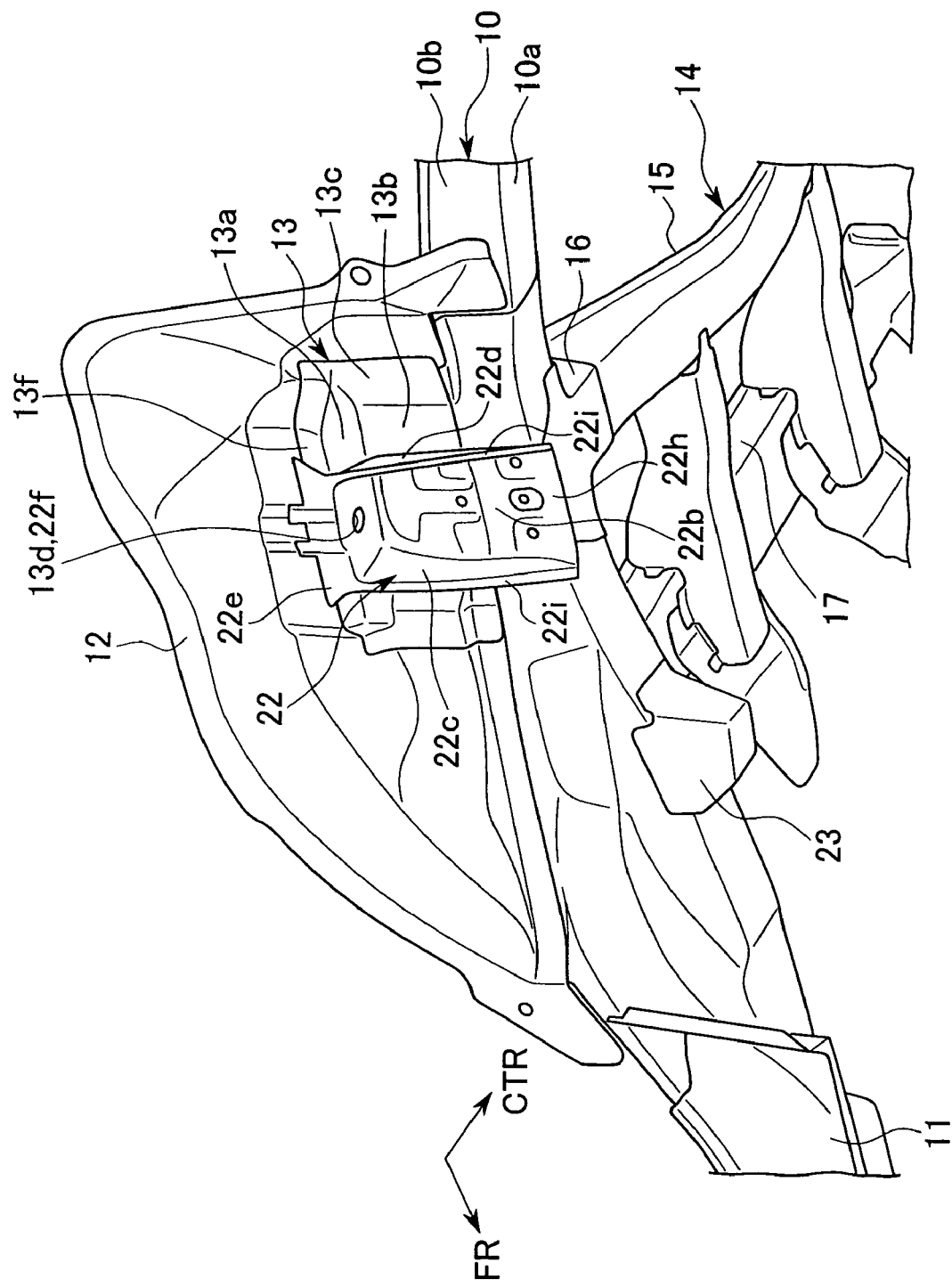
FIG. 4 is a perspective view of a side portion of the vehicle body in the embodiment, which is viewed from the bottom side of the vehicle, and from a rear direction.
Figure 5:
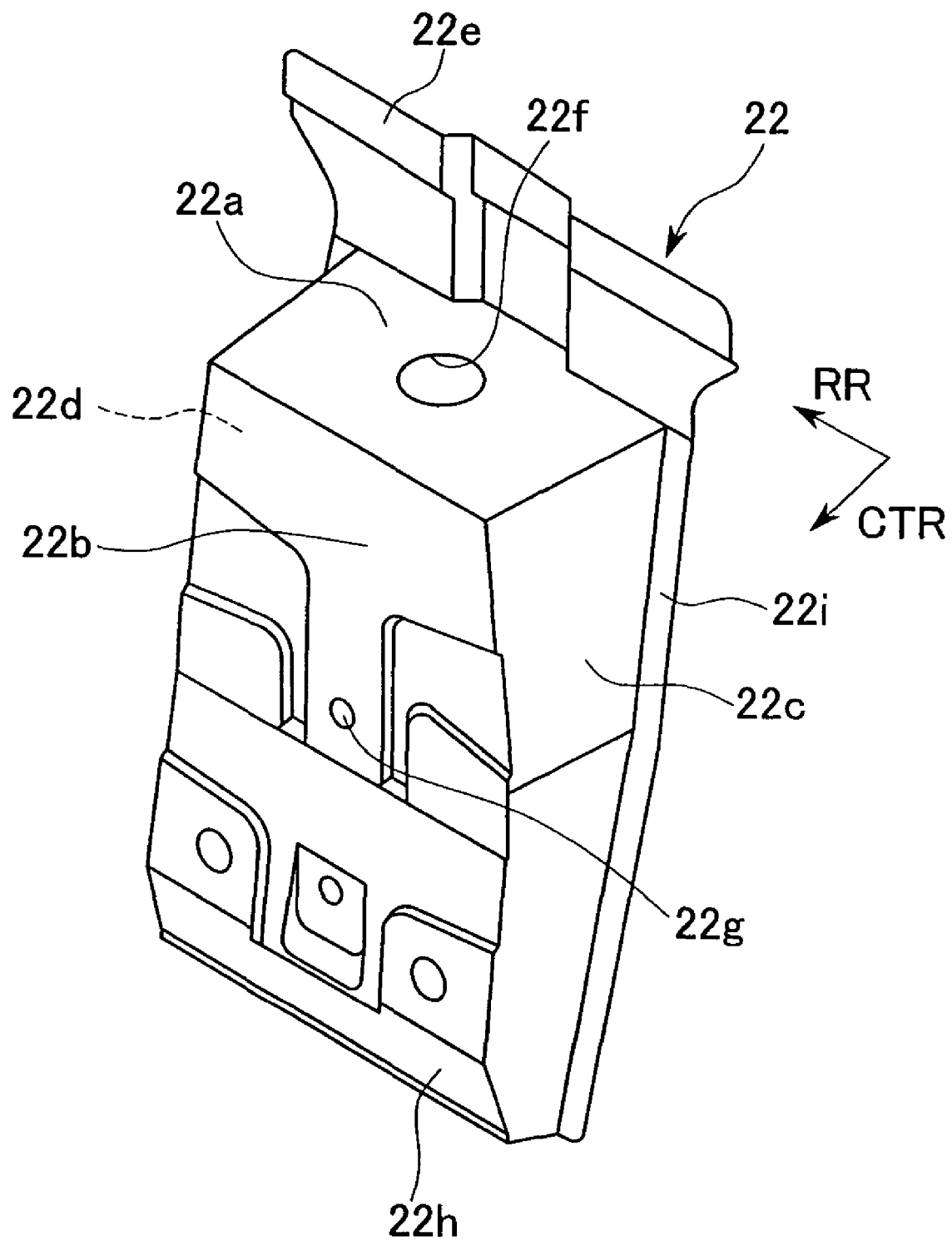
FIG. 5 is a perspective view of a gusset in the embodiment.
Figure 6:
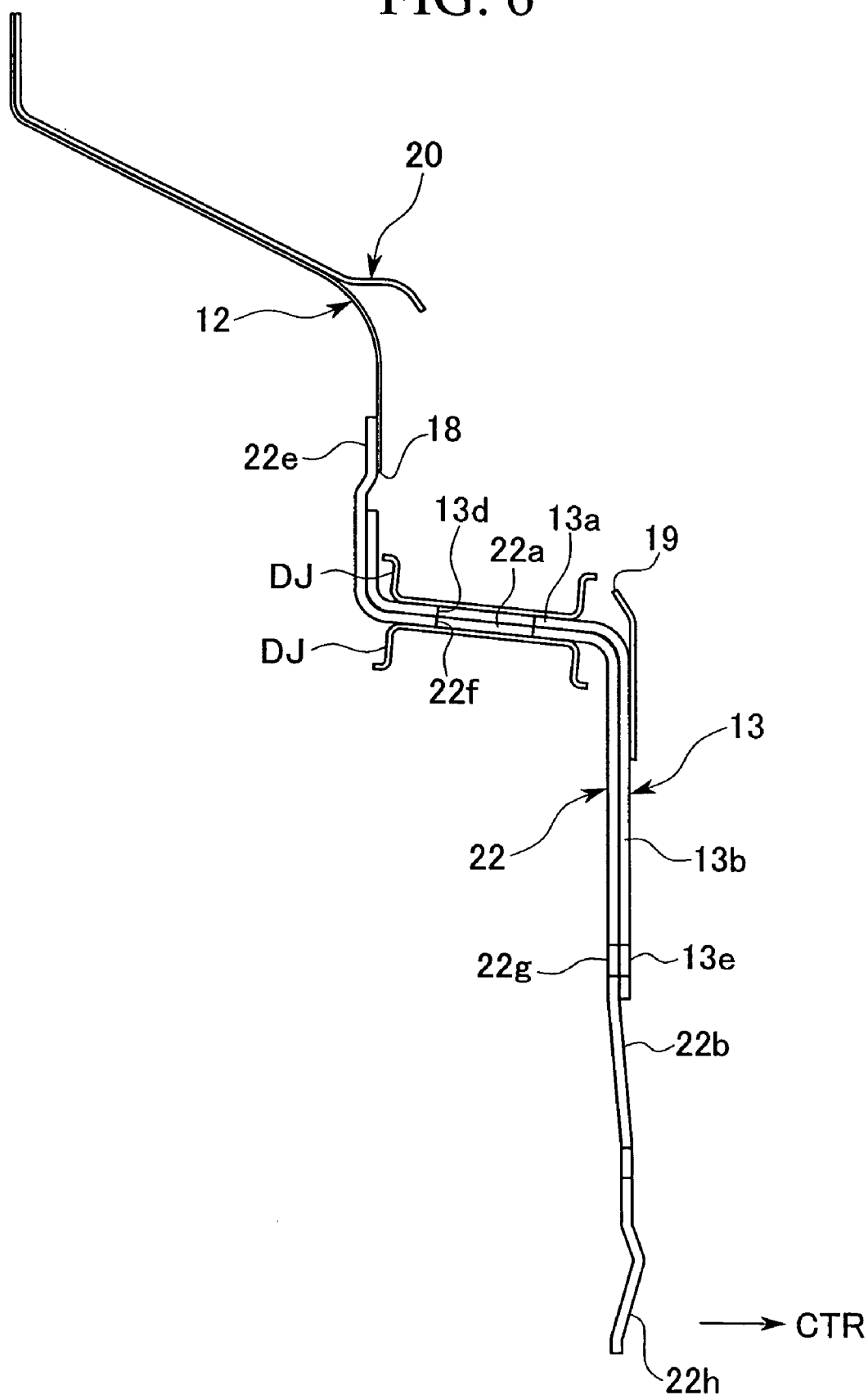
FIG. 6 is a sectional view along line A—A in FIG. 2.

As shown in FIG. 4, the gusset 22, having a relatively large thickness similar to that of the damper base 13, is provided at the outside of the damper base 13 (i.e., outside of the interior of the vehicle). This gusset 22 is attached to a plurality of portions, that is, to the upper wall 13a and the side wall 13b of the damper base 13, and the side wall 10b of the rear frame 10. More specifically, as shown in FIGS. 5 and 6 (FIG. 6 is a sectional view along line A—A in FIG. 2), the gusset 22 has (i) an upper wall 22a combined with the bottom face of the upper wall 13a of the damper base 13, (ii) a side wall 22b fastened to the outer face of the side wall 13b of the damper base 13 and the side wall 10b of the rear frame 10 by using bolts or rivets, by welding, or the like, and (iii) a front wall 22c and a rear wall 22d, which are joined to both the upper wall 22a and the side wall 22b.

The width of each of the front wall 22c and the rear wall 22d gradually decreases when measured from the top to the bottom. The side wall 22b, the front wall 22c, and the rear wall 22d form a U-shaped section having an opening which opens toward the outside of the interior of the vehicle, so that the damper D can be effectively disposed in the opening. The side wall 22b of the gusset 22 has an attachment hole 22g for the damper base 13, and an attachment hole 13e, whose position corresponds to the attachment hole 22g, is formed in the damper base 13. In addition, reinforcement flanges 22i and 22i (refer to FIGS. 4 and 5) are formed, which respectively extend from the front wall 22c and the rear wall 22d in the front-rear direction.

A flange 22e is also formed, which extends upward from the upper wall 22a of the gusset 22. This flange 22e is joined to the upper flange 13f which is formed at the upper wall 13a of the damper base 13, and also to the wheelhouse inner panel 12. In the upper wall 22a of the gusset 22, an attachment hole 22f for the damper D is formed.

The lower portion of the gusset 22 is fastened to the side wall 10b of the rear frame 10 by using bolts or rivets, by welding, or the like; however, the lower flange 22h of the side wall 22b protrudes downward from the bottom wall 10a of the rear frame 10, and the above-explained attachment flange 16d of the joint member 16 is joined to the lower flange 22h. In addition, a mount bracket 23 (see FIG. 4) for the rear suspension RS (see FIG. 7), is attached to the bottom wall 10a of the rear frame 10, where the mount bracket 23 is positioned in front of the gusset 22.

Accordingly, the gussets 22 (at both sides) are fastened to the cross member portion 14 between the damper bases 13 and are fastened to the rear frames 10 arranged in the front-rear direction of the vehicle.

Figure 7:
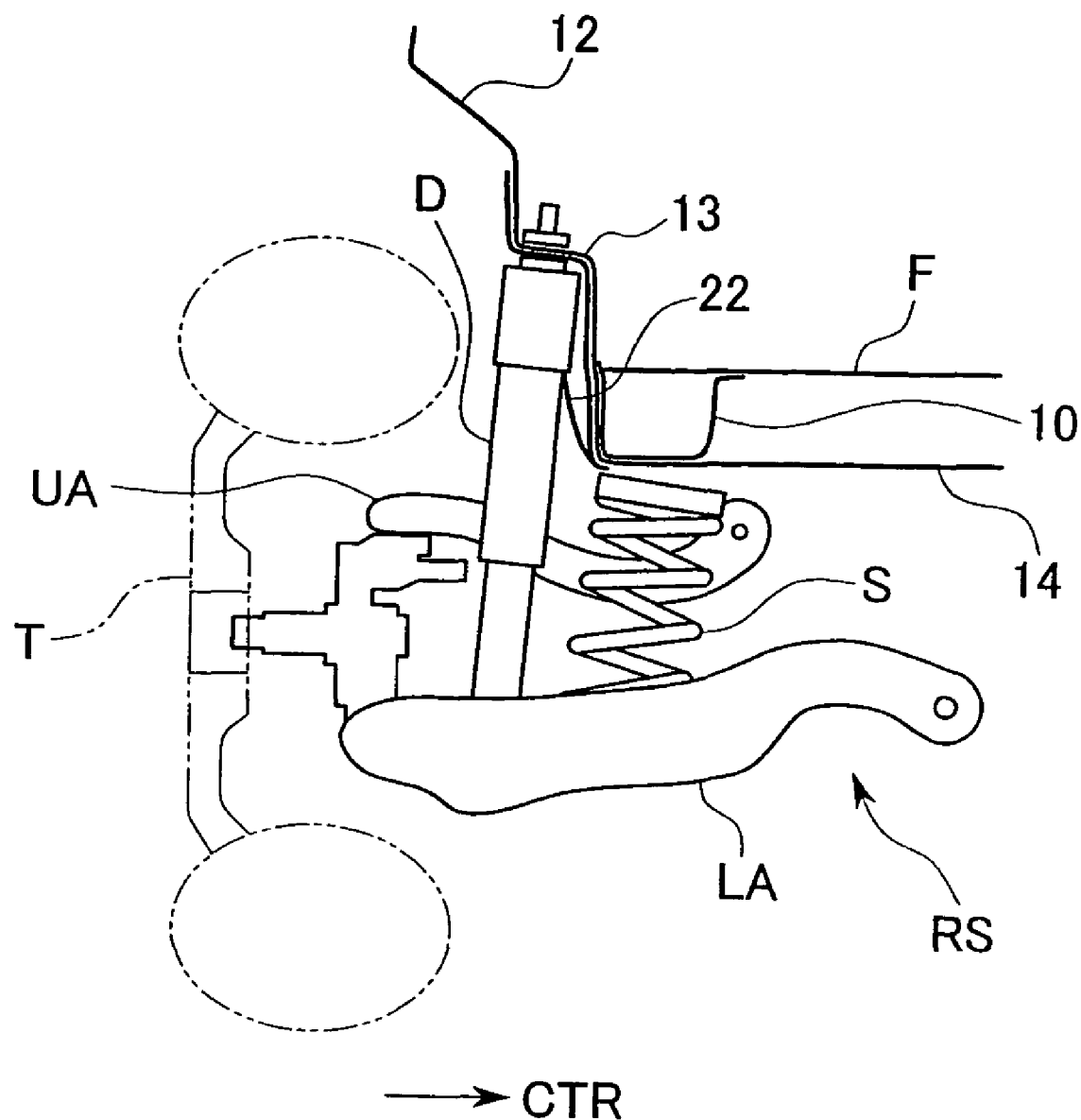
FIG. 7 is a diagram showing the general structure of a rear suspension and peripheral portions in the embodiment.
Figure 8:
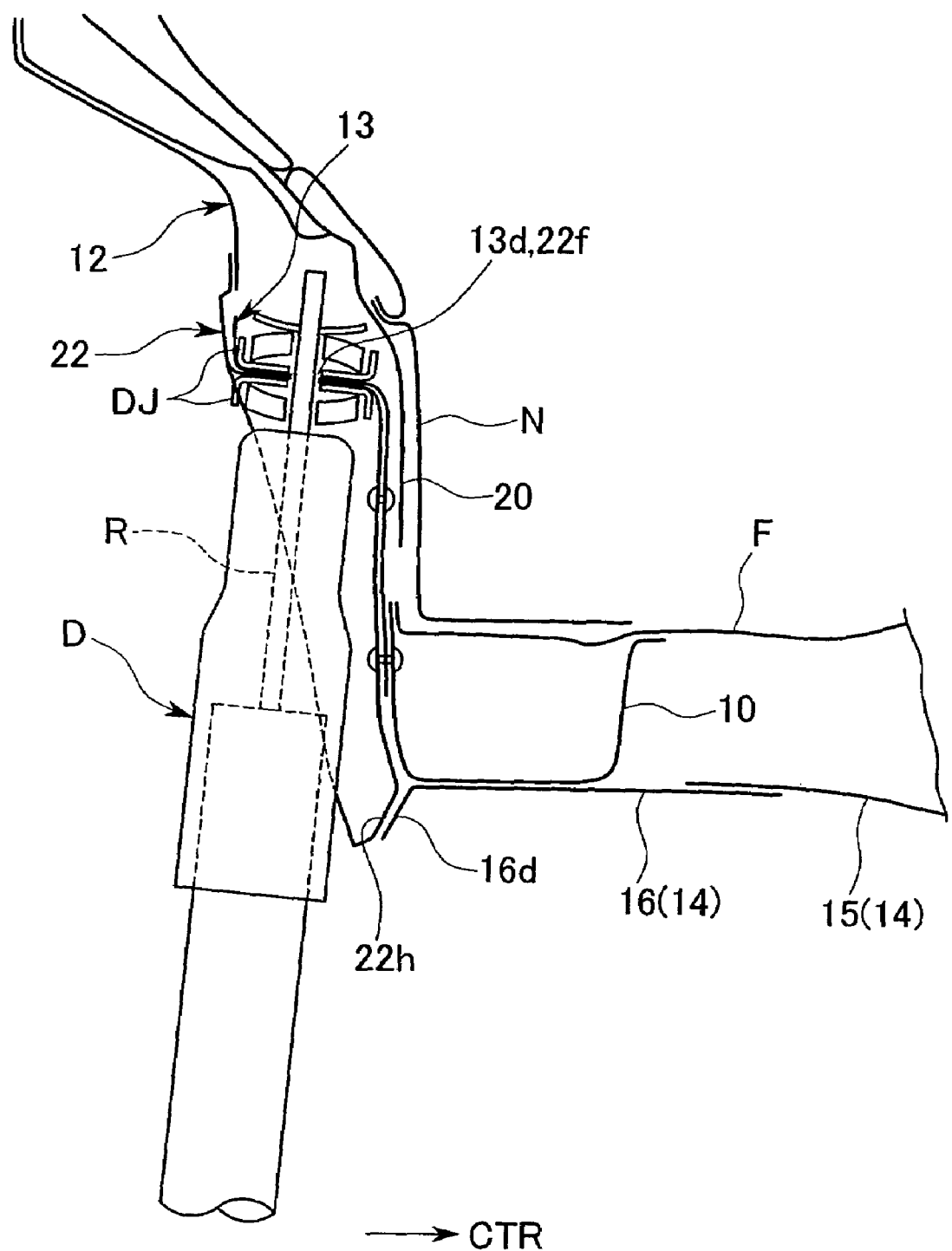
FIG. 8 is an enlarged view of the major parts in FIG. 7.
Figure 9:
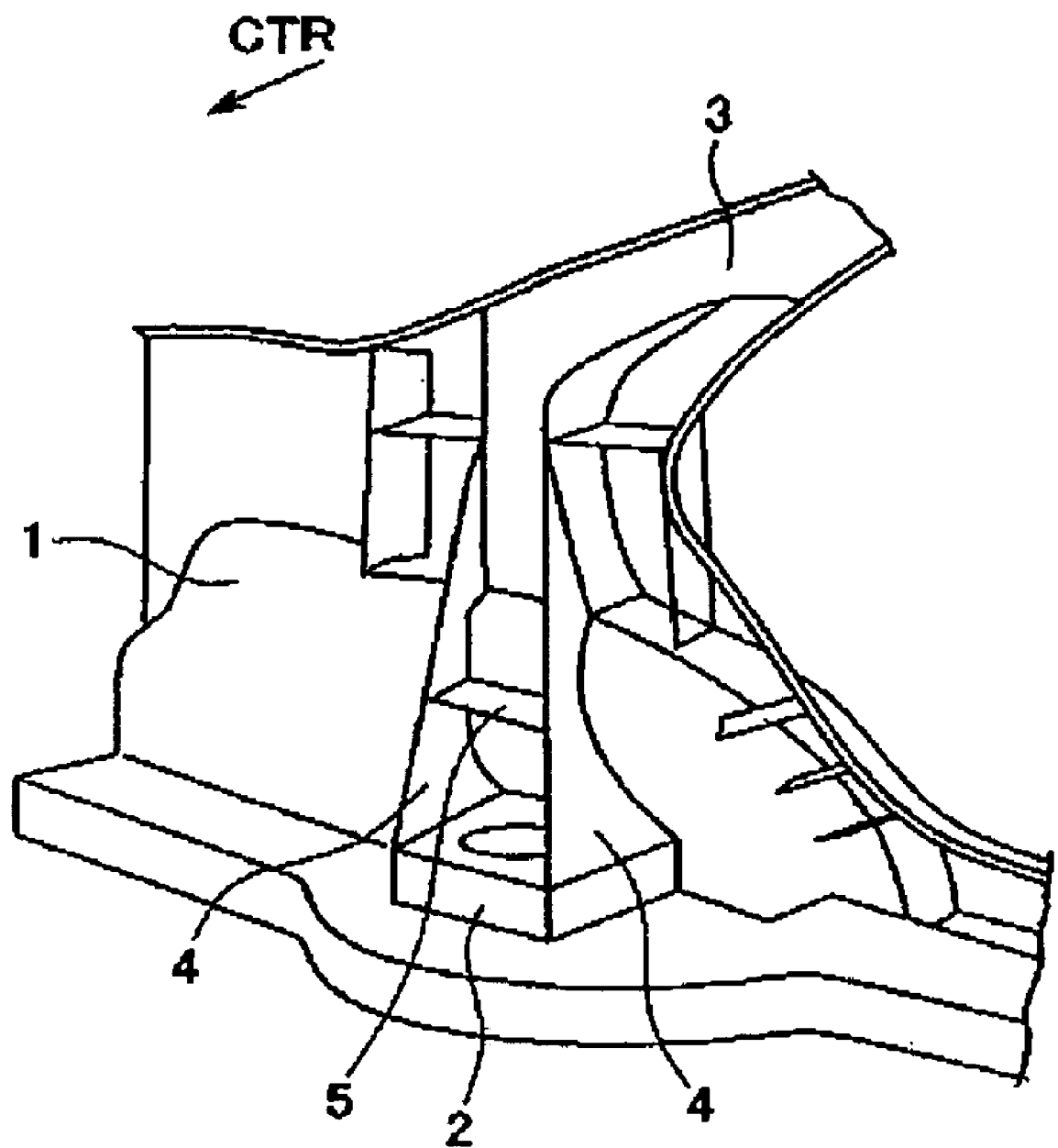
FIG. 9 is a perspective view of a conventional structure, which is viewed from the interior of a vehicle.

As shown in FIG. 7, the rear suspension RS is provided at the outside of the wheelhouse inner panel 12 (i.e., outside of the interior of the vehicle). The rear suspension RS consists of the upper arm UA, the lower arm LA, the coil spring S, and the damper D. As shown in the enlarged view of FIG. 8, the upper end of the rod R of the damper D is fastened in a manner such that the upper end is inserted in the attachment hole 22f of the gusset 22 and the attachment hole 13d of the damper base 13. The interior material N (for interior finish work) is arranged from the inner surface of the wheelhouse inner panel 12 to the floor panel F without protruding toward the inside of the interior of the vehicle. Here, in FIGS. 6 and 8, reference symbols DJ and DJ indicate damper joints, and in FIG. 7, reference symbol T indicates a tire.

According to the above-explained embodiment, the gussets 22 are provided at the outside of the damper base 13, that is, the outside of the interior of the vehicle; thus, the gussets 22 do not protrude toward the inside of the interior, thereby securing more space in the interior. Therefore, when the interior material N is arranged at the inside of the wheelhouse inner panel 12 (i.e., the inside of the interior), protrusion of the interior material N (due to the gussets) toward the inside of the interior does not occur because the gussets 22 do not protrude toward the inside of the interior. Therefore, it is possible to secure neat and sufficient space for stowing baggage and for passengers who sit at the rear side of the vehicle.

In addition, even if force acts on the gusset 22 from the rear suspension RS in the horizontal direction and the damper D is going to fall toward the inside of the interior and deform the vehicle body, such force in the horizontal direction is transmitted via the lower flange 22h of the gusset 22 and the joint member 16 and the load corresponding to the force is imposed on (i.e., shared by) a plurality of portions such as the cross member portion 14, which is a constituent of the framework of the vehicle body and is arranged in the width direction of the vehicle, and the rear frame 10 and the bulkhead 21 at the opposite side, thereby preventing the damper base 13 from falling toward the inside of the interior of the vehicle. Therefore, the rigidity of the vehicle body around the rear suspensions RS can be improved using existing members of the vehicle body structure.

The gusset 22 has a U-shaped section which is effective for securing necessary strength, and by which a space for disposing the damper D can be secured, where the space is surrounded by the front wall 22c, the rear wall 22d, and the side wall 22b. That is, the arrangement space for the damper D can be secured without providing a dedicated space, and sufficient strength and rigidity can be secured by using the gussets 22 whose thickness is not particularly large. Therefore, the above embodiment contributes to space-saving and lightening of the vehicle body.

In addition, the damper D is disposed in a space surrounded by the front wall 22c, the rear wall 22d, and the side wall 22b of the gusset 22; thus, the damper D can be protected.

Furthermore, the lower portion of each gusset 22, that is, the side wall 22b of the gusset 22, is fastened to the side wall 10b of the rear frame 10; thus, the force acting on the rear suspension RS is imposed on the rear frame 10 arranged in the front-rear direction of the vehicle. Also owing to such a structure, sufficient strength and rigidity can be secured without needing a particularly large thickness of the gusset 22, thereby contributing to the lightening of the vehicle body.

The present invention is not limited to the above-explained embodiment. For example, the above embodiment is applied to the rear suspensions RS; however, the present invention can also be applied to the front suspensions.

What is claimed is:

1. A body structure of a vehicle, comprising:
   damper bases provided at both sides of the vehicle in a width direction of the vehicle;
   a cross member portion which is provided between the damper bases and consists of a cross member having a U-shaped section and joint members attached to both ends of the cross member;
   rear frames arranged in a front-rear direction of the vehicle, wherein each rear frame has a U-shaped section and is positioned between each damper base and the cross member, and is fit to each joint member;
   a bulkhead attached inside each rear frame, so as to prevent the U-shaped rear frame from being deformed and opened; and
   gussets respectively fastened to the joint members of the cross member portion, wherein
   each gusset is provided at the damper base and is attached at the outside of an interior of the vehicle to at least an upper wall and a side wall of each damper base, and a lower portion of said each gusset is fastened to the respective joint member;
   each gusset has a side wall, and a front wall and a rear wall on either side of the side wall, so as to form a U-shaped section of said each gusset with the side, the front, and the rear walls and an opening surrounded by the side, the front, and the rear walls; and
   a damper of a rear suspension of the vehicle is disposed respectively in each said opening.

2. A body structure as claimed in claim 1, wherein each gusset further has:
   an upper wall combined with a bottom face of the upper wall of the damper base;
   the side wall of said each gusset is fastened to an outer face of the side wall of the damper base; and
   the front wall and the rear wall, of said each gusset are each joined to the upper wall and the side wall of said each gusset.

3. A body structure as claimed in claim 2, wherein each said the opening is surrounded by the upper wall, the side wall, the front wall, and the rear wall of said each gusset, respectively, and the respective damper is disposed in each said opening.

* * * * *